Dec. 3, 1935.   A. H. OELKERS   2,023,092
ROLLER BEARING
Filed Feb. 20, 1931   2 Sheets-Sheet 1
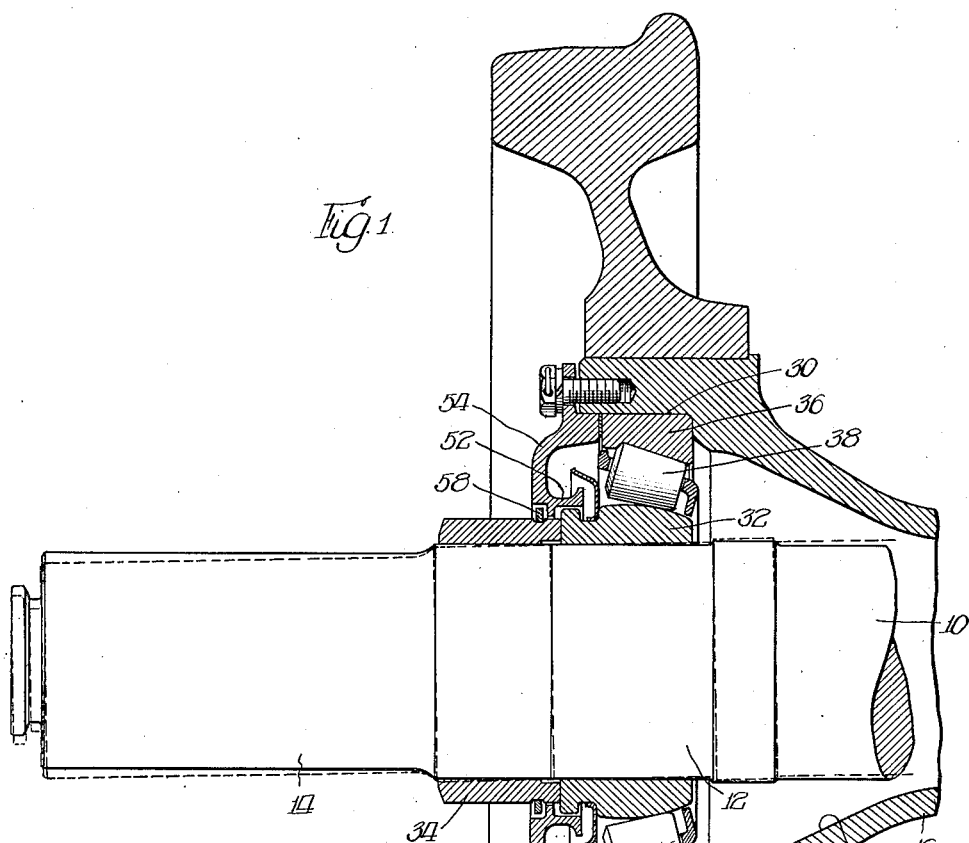
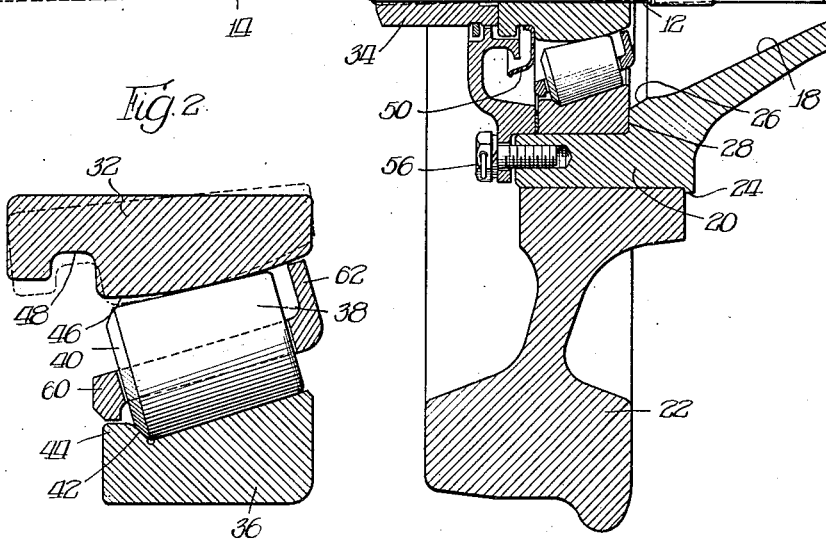
Inventor:
Alfred H. Oelkers Dec. 3, 1935.  A. H. OELKERS  2,023,092
ROLLER BEARING
Filed Feb. 20, 1931  2 Sheets-Sheet 2
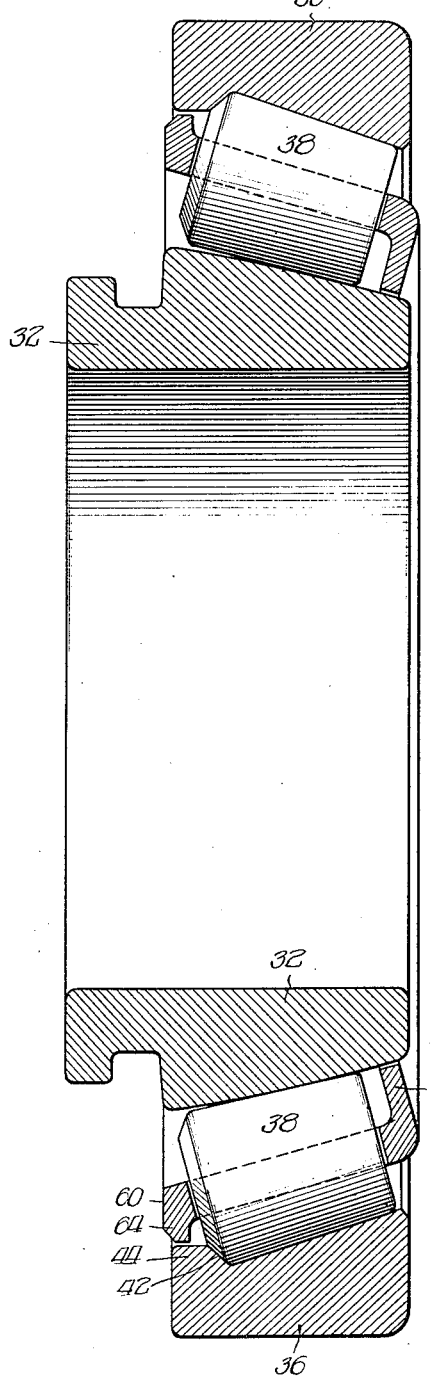
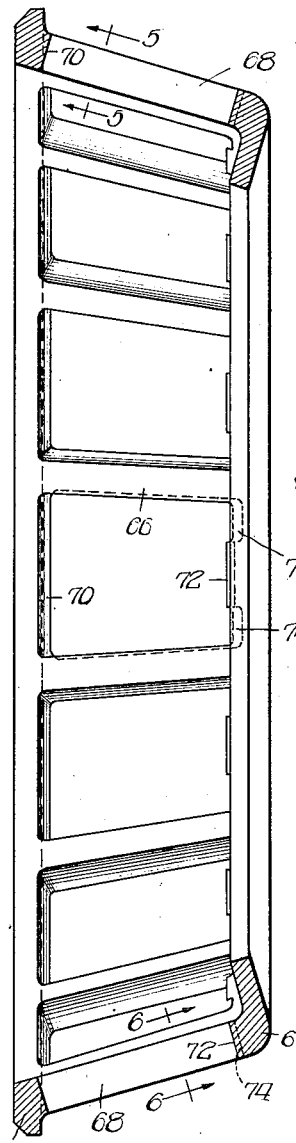
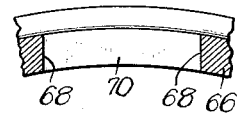
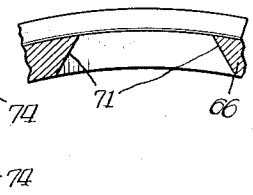
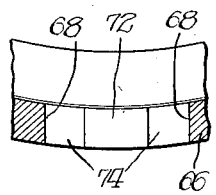

Patented Dec. 3, 1935

2,023,092

UNITED STATES PATENT OFFICE 2,023,092

ROLLER BEARING

Alfred H. Oelkers, Chicago, Ill., assignor to American Steel Foundries, Chicago, Ill., a corporation of New Jersey Application February 20, 1931, Serial No. 517,282

19 Claims. (Cl. 295—36)

This invention pertains to railway rolling stock, and more particularly to wheel and axle assemblies embodying anti-friction bearings.

During the development of roller bearing units, it was found that special details of construction were necessary for the bearings to properly function in transmitting different loads. It was also found that in order to have the bearings function properly over a long period of time, the bearings must be kept clean and thoroughly lubricated, and moisture must be excluded. Grit and dirt, of course, cause wearing away of the surfaces of bearings, rendering the same inefficient. Moisture interferes with the proper lubrication of the bearings and causes or tends to cause corrosion. Some attention must also be paid to providing a bearing which can be easily and effectively assembled with the parts of the roller bearing units, and to this end, it is desirable to provide a bearing which is partially self-contained.

In a railway axle mounting, the bearing cup or outer race revolves with the wheels. The rollers revolve around the axle and within the cup and are constantly being forced outwardly against the cup by centrifugal action with increased pressure directly dependent upon the square of the speed. It is important to design a cage which is itself properly guided to diminish the tendency to drag, whereby the individual rollers would be under heavier duty to urge the cage to rotation. Previously, the cage has been guided by the stationary race or bearing cone which tends to retard its rotation, thereby tending to prevent the rollers from being guided by the cup. The most ideal condition is for the rollers and the cage to be guided by the revolving parts of the assembly which tend to carry them along in a parallel plane with respect to the wheels, all the other parts which revolve about the axle also to have the inner, stationary axle only in contact with the surfaces of the rollers on which the radial thrust loads are carried. At the same time, it is desirable that a cage be provided which will not restrict lubrication of the anti-friction bearings, but, on the contrary, will aid in the lubrication thereof, especially adjacent thrust shoulders provided on a race ring of the bearings.

The bearing surfaces of the cage which come in contact with the rollers must also be so disposed and shaped as to provide a minimum of friction, and of course a minimum of contacting surfaces is desirable. The rollers must be disposed to be properly guided so that they travel in the same plane as the rotating wheel, and the guiding surfaces for the cage must not interfere with this operation.

It is therefore an object of this invention to provide a roller bearing for railway service which has conically shaped, angularly spaced rollers proportioned so that they have the least possible friction on the roller surfaces and at the same time have the inner race or cone of the bearing crowned so that it will permit the required amount of deflection of the inner axle without overloading the rollers near their ends.

Another object of this invention is to provide a roller bearing for a railway axle assembly which is particularly well adapted to inspection by merely removing the axle housing cover plate.

A still further object of this invention is to devise a complete assembly of roller bearings within the railway axle unit which is particularly easy to lubricate and which prevents loss of lubricant through the joint between the cover plate and the inner axle. When approaching a stop or when rotation is slow, the lubricant has a tendency to fall by gravity from the larger diameters where it has been evenly distributed by the action of centrifugal force, and at such time, the construction I feature is of particular value in preventing loss of lubricant. This is accomplished by the combined design and action of the roller bearing cage and cover plate. It will be noted that the space between each of the rollers, as well as the space between the ends of the rollers and the cover plate, is closed by the roller cage and that the closing of these spaces in such a manner completely separates the lubricant carrying portion of the roller bearing from that portion of the bearing and cover plate which form the mechanical seal with the parts of the inner axle. This construction has proved particularly valuable in effectively preventing the loss of lubricant during all operating conditions.

Still another object of this invention is to devise a practical bearing for railway use which can be easily dismantled so that the various parts can be examined as a matter of periodical complete bearing inspection.

In a self-contained bearing, where a support is provided for the bearings, under certain conditions the support must be of such character that it will not interfere with the anti-friction properties of the bearings. Most all anti-friction bearings tend to be frictional under certain loadings, working or stressing of the parts of the assembly, and it is therefore an object of this invention to provide a roller bearing assembly which is inexpensive to make and maintain, and, as nearly as possible, functions as an anti-friction bearing under all conditions of operation.

A further object of the invention is to provide a roller bearing assembly wherein the race is free from any influence from non-rotating parts of the assembly, and wherein perforations in the cage in which the individual rollers are carried are set in with respect to the rollers so that each roller may be free to bear against the revolving cup, whereby there is a direct tendency to carry the rollers around with the least amount of friction between the cage and rollers.

Yet another object of the invention is to provide a construction for a wheel and axle assembly which will positively prevent any tendency of the entrance of foreign matter to the roller bearing, and so proportioned that lubricant is prevented from being drained and is positively supplied to the bearing no matter what the condition of operation of the bearing.

A still further object of the invention is to provide a construction which is readily applicable to existing roller bearing units, and one which is easily applied and serves to maintain the bearings in position.

With these and various other objects in view, the invention may consist of certain novel features of construction and operation, as will be more fully described and particularly pointed out in the specification, drawings and claims appended hereto.

In the drawings, which illustrate an embodiment of the device, and wherein like reference characters are used to designate like parts—

Figure 1 is a fragmentary sectional elevation through a wheel and axle assembly embodying a form of the invention, wherein the dotted line position of the inner axle represents a deflected position of said axle;

Figure 2 is an enlarged fragmentary sectional elevation through a portion of a roller bearing assembly, dotted lines indicating the position of the inner race ring when the axle is deflected as shown in Figure 1;

Figure 3 is an enlarged sectional elevation through the roller bearing assembly;

Figure 4 is an enlarged sectional elevation through the roller bearing cage;

Figure 5 is a sectional elevation taken substantially in the plane as indicated by line 5—5 of Figure 4;

Figure 6 is an enlarged sectional elevation taken substantially in the plane as indicated by line 6—6 of Figure 4; and Figure 7 is a view corresponding to Figure 5, showing a modified form of cage.

In the roller bearing construction illustrated, only certain portions of the assembly are shown and described, as it is to be understood that the constructions are duplicated at the opposite ends of the assembly. Although the inner axle is described as a normally non-rotatable axle, this is taken to mean that it is not revoluble with the wheels as the outer rotatable axle or casing. The inner axle may be stationary, partially rotatable, or free to rotate or creep, as desired.

The inner normally non-rotatable axle 10 is provided with the cylindrical bearing portion 12 and the cylindrical bearing portion 14 which is adapted, for example, to extend within the usual journal box (not shown) and cooperates with the brasses and wedges therein in a well known manner. The outer rotatable axle or casing 16 is flared at its ends to form the lubricant recess 18 and terminates at each end in a wheel receiving portion 20, the wheel 22 being positioned thereon by means of the shoulder 24. The lubricant recess is beveled as at 26, sloping into a shoulder 28 defining the inner cylindrical bearing receiving portion 30. The inner race ring or cone 32 is pressed on the bearing receiving portion 12 of the inner axle and is maintained in operative position by means of the shrink collar 34 disposed on the inner axle and engaging the cone. The bearing cup or outer race ring 36 is disposed within the portion 30 and limited by the shoulder 28 in its inward movement, and, as shown, the bearing surface of the cup on which the rollers travel is substantially of the shape of the right frustrum of a cone having the same angle as the rollers 38.

The rollers 38 are in the shape of the right frustrum of a cone with the large end of the rollers being disposed outwardly of the assembly the axes of the rollers sloping outwardly. The large end of each roller is provided with a smaller frusto-conical portion 40, the surface of which contacts a complementary surface 42 provided on the thrust shoulder 44 of the cup. The roller, of course, carries the load against the bearing cup on the large conical surface and is held in position lengthwise by rolling in the bearing cup, and is guided by the guiding shoulders contacting the end of the roller. The bearing cone or inner race ring 32 is nominally in the shape of the right frustrum of a cone, with the exception that the elements of the bearing surface 46 contacting the roller are slightly curved, this curve having been greatly exaggerated in the drawings to properly illustrate the action of the parts when the inner axle deflects.

The diameter of the cone at a point directly opposite the large end of the roller is slightly smaller than will contact the roller at this point when there is no load on the axle assembly. The diameter of the bearing cone at a point opposite the small end of the roller is likewise reduced and the deviation from a right cone presented by the surface of the roller bearing cone is made just sufficient to prevent concentrating the load between the cup surface and the roller at either end of the roller under the various loads carried by the axle. In other words, in assembling the roller bearing unit under no load, the roller bearing contacts the bearing cone at a point slightly nearer the small end of the roller, the clearance between the large end of the roller and the cone being slightly greater than the clearance between the small end of the roller and the cone.

When the assembly is loaded and the inner axle deflects, the elements taken in vertical planes through the cones and rollers tend to contact over a surface rather than at a point due to the deflection of the elements of the cone and bearing. When the load is applied to deflect the shaft or axle on which the cone is mounted, the contact between the cone surface and the rollers lengthens out toward the larger end of the rollers in such a manner that the center of this contact surface is approximately mid-point between the ends of the rollers when the bearing is loaded to its full operating condition. While the elements forming the bearing surface of the cone may be portions of circumferences of circles, still no two elements are formed on the same circumference. The surface of the cone, then, is such that when the axle is under its maximum bending moment and when the end of the axle is deflected downwardly the maximum amount, the end of the line of contact between the cone surface and the roller will be adjacent the large and small ends of the roller due to the tendency of the elements of the cone and bearing to straighten or coincide.

The cone is provided with a lubricant groove 48 which extends circumferentially thereof and is used to conduct lubricant from the upper portion of the assembly to the lower portion when movement of the assembly is arrested, there being provided a deflecting ring 50 overlying the channel 52 provided in the cover plate 54 for deflecting the oil toward the bearings. The cover plate 54 is secured by suitable bolts 56 to the outer axle and revolves therewith, and there is provided interfitting means 58 for preventing ingress of foreign matter to the roller bearings.

The cage 60 separating the rollers is substantially Z-shaped in section, the inner leg 62 extending inwardly toward the cone and adapted to run in close proximity thereto, the outer leg 64 being disposed adjacent the thrust shoulder 44 whereby the cage is guided and caused to rotate concentrically with the bearing without dependence on guidance from the rollers, and therefore will not have any tendency to cause misalignment of the rollers so that the rollers will always run in the plane of the wheels.

The cage is provided with the spacing ribs 66 connecting inner and outer ring members 67 and 69, the sides 68 of which are in the shape of planes tangent to the conical roller surface; and, whereas it is shown (Figures 5 and 6) that these planes are parallel, they may of course be angularly disposed as at 71 (as shown in Figure 7), which construction will be used when it is desired to form the roller cage in a die casting where it is necessary to have some divergence or angularity in the sides of the perforations for the purpose of proper die draft.

The ends of the rollers are guided by plane surfaces 70 and 72, it being seen that the plane surface of the inner or smaller end of the roller is made narrower, as by undercutting as at 74, in order to make contact in the center portion of the roller end only. The cage is preferably in the form of a simple casting or forging in a unit piece, held in position by the relative assembly of the bearing, cone, rollers and cup.

When the cone is withdrawn from the bore of the bearing cup the rollers are loose to fall out of the cage perforations. The cage is free to be removed from all other parts of the roller bearing as soon as the cone is withdrawn from the bore of the cup.

In operation, when the inner axle deflects the load is concentrated toward the larger end of the roller. The curvature of the cone is such that stress concentration is not at the end of the rollers or near the end of the individual rollers, as this would cause undue wear and disintegration on both the rollers and the cone. The sides of the roller perforations in the cage, being of plane shape, contact only one element of the roller at a time, which condition assists the lubricant in wedging between the cage and the sides of the roller, and therefore effects more perfect lubrication than can be obtained in roller cages which have larger contacting surfaces on the sides of the rollers. This, of course, can be done, as the guiding of the rollers is effected by the cup.

With this construction it will be appreciated that a very simple yet effective construction is provided, and it is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a bearing assembly, the combination of inner and outer racerings, anti-friction bearings disposed between and in rolling contact with said racerings, and means separate from said racerings cooperating with said anti-friction bearings and cooperating with one of said racerings whereby movement of said racering moves said means and said bearings.

2. In a bearing assembly, the combination of inner and outer racerings, anti-friction bearings disposed between and in rolling contact with said racerings, and means separate from said racerings cooperating with said anti-friction bearings and cooperating with said outer racering whereby movement of said racering moves said means and said bearings.

3. In a bearing assembly, the combination of inner and outer racerings, anti-friction bearings disposed between and in rolling contact with said racerings, one of said racerings having a guide member for guiding said anti-friction bearings, means cooperating with said anti-friction bearings and cooperating with said guide member whereby movement of said guide member moves said means and said bearings.

4. In a bearing assembly, the combination of inner and outer racerings, anti-friction bearings disposed between and in rolling contact with said racerings, said outer racerings having a guide member for guiding said anti-friction bearings, means cooperating with said anti-friction bearings and cooperating with said guide member whereby movement of said guide member moves said means and said bearings.

5. In a bearing assembly, the combination of inner and outer racerings, anti-friction bearings disposed between and in rolling contact with said racerings, and a cage cooperating with said anti-friction bearings and cooperating with one of said racerings whereby movement of said racering moves said cage and said rollers, said cage having spacing members, said members being disposed to have only a line contact with said bearings.

6. In a bearing assembly, the combination of inner and outer racerings, anti-friction bearings disposed between and in rolling contact with said racerings, and a cage cooperating with said anti-friction bearings and cooperating with one of said racerings whereby movement of said racerings moves said cage and said bearings.

7. In a bearing assembly, the combination of inner and outer racerings, anti-friction bearings disposed between and in rolling contact with said racerings, one of said racerings having a guide member for guiding said anti-friction bearings, and a cage cooperating with said anti-fricton bearings and cooperating with said guide member whereby movement of said guide member moves said cage and bearings.

8. In a bearing assembly, the combination of inner and outer racerings, anti-friction bearings disposed between and in rolling contact with said racerings, said outer racering having a guide member for guiding said anti-friction bearings, and a cage cooperating with said anti-friction bearings and cooperating with said guide member whereby movement of said guide member moves said cage and bearings.

9. In a bearing assembly, the combination of inner and outer racerings, anti-friction bearings disposed between and in rolling contact with said racerings, one of said racerings having a guide member for guiding said anti-friction bearings, and a cage cooperating with said anti-friction bearings and cooperating with said guide member whereby movement of said guide member moves said cage and bearings, said cage having spacing members disposed to have only a line contact with said bearings.

10. In a bearing assembly, the combination of inner and outer racerings, anti-friction bearings disposed between and in rolling contact with said racerings, said outer racering having a guide member for guiding said anti-friction bearings, and a cage cooperating with said anti-friction bearings and cooperating with said guide member whereby movement of said guide member moves said cage and bearings, said cage having spacing members disposed to have only a line contact with said bearings.

11. In a bearing assembly, the combination of inner and outer racerings, anti-friction bearings disposed between and in rolling contact with said racerings, one of said racerings having a guide member for guiding said anti-friction bearings, and a cage cooperating with said anti-friction bearings and cooperating with said guide member whereby movement of said guide member moves said cage and bearings, said cage for said bearings including spacing members, the sides of said members defining the bearing openings being parallel.

12. In a bearing assembly, the combination of inner and outer racerings, anti-friction bearings disposed between and in rolling contact with said racerings, one of said racerings having a guide member for guiding said anti-friction bearings, and a cage cooperating with said anti-friction bearings and cooperating with said guide member whereby movement of said guide member moves said cage and bearings, said cage member for said bearings including spacing members, one end of the openings defined by said members being provided with a member for contacting only a part of the adjacent end of the rollers.

13. In a bearing assembly, the combination of inner and outer racerings, anti-friction bearings disposed between and in rolling contact with said racerings, and a cage cooperating with said anti-friction bearings and cooperating with said outer racerings whereby movement of said outer racering moves said cage and anti-friction bearings, said cage having spacing members disposed to have only a line contact with said bearings.

14. In a bearing assembly, the combination of inner and outer racerings, anti-friction bearings disposed between and in rolling contact with said racerings, said outer racering having a guide member for guiding said anti-friction bearings, and a cage cooperating with said anti-friction bearings and cooperating with said guide member whereby movement of said outer racering moves said cage and anti-friction bearings, said cage having spacing members disposed to have only a line contact with said bearings.

15. In a bearing assembly, the combination of inner and outer racerings, one of said racerings having a curved bearing surface, anti-friction rollers between and in rolling contact with said racerings, a cage cooperating with one of said racerings and said rollers whereby movement of said racering moves said cage and said rollers, said curved bearing surface being spaced at varying distances from each of the ends of said rollers.

16. In a bearing assembly, the combination of inner and outer racerings, one of said racerings having a curved bearing surface and the other of said racerings being provided with a roller guide member, anti-friction rollers between and in rolling contact with said racerings, said rollers cooperating with said guide member whereby the same are guided, a cage cooperating with said rollers and said guide member whereby movement of said guide member moves said cage and said rollers, said curved bearing surface being spaced at varying distances from each of the ends of said rollers.

17. In a bearing assembly, the combination of inner and outer racerings, one of said racerings having a curved bearing surface and the other of said racerings having a frusto-conical bearing surface, said other racering having a guide member adjacent said frusto-conical bearing surface, tapered frusto-conical anti-friction rollers between and in rolling contact with said surfaces, said rollers cooperating with said guide member whereby the same are guided, a cage cooperating with said rollers and said guide member whereby movement of said guide member moves said cage and said rollers, said curved bearing surface being spaced at varying distances from each of the ends of said rollers.

18. In a railway wheel and axle assembly, the combination of an outer rotary axle, an inner normally fixed axle, an anti-friction assembly between said axles, said assembly comprising an inner and outer racering mounted on said axles, anti-friction rollers between and in rolling contact with said racerings, one of said racerings having a guide member adapted to guide said rollers and to take end thrust and the other of said racerings having a bearing surface permitting deflection of said inner axle, a shrink collar on said inner axle for positioning said anti-friction assembly, a closure plate mounted on said outer axle and extending toward said shrink ring, said shrink ring having means cooperating with said cover plate for excluding foreign matter from said anti-friction bearings, and a cage cooperating with said rollers and said guide member whereby movement of said guide member moves said cage and said rollers.

19. In a railway wheel and axle assembly, the combination of an outer rotary axle, an inner normally fixed axle, an anti-friction assembly between said axles, said assembly comprising an inner and outer racering mounted on said axles, anti-friction rollers between and in rolling contact with said racerings, one of said racerings having a guide member adapted to guide said rollers and to take end thrust and the other of said racerings having a bearing surface permitting deflection of said inner axle, and a cage cooperating with said rollers and said guide member whereby movement of said guide member moves said cage and said rollers.

ALFRED H. OELKERS.